2
United States Patent [19]

Borrelli et al.

[11] 4,304,584

[45] Dec. 8, 1981

[54] METHOD FOR MAKING POLARIZING GLASSES BY EXTRUSION

[75] Inventors: Nicholas F. Borrelli, Elmira;
Kuang-hsin K. Lo, Big Flats, both of N.Y.

[73] Assignee: Corning Glass Works, Corning, N.Y.

[21] Appl. No.: 144,451

[22] Filed: Apr. 28, 1980

[51] Int. Cl.³ .................... C03B 17/00; C03B 19/00; C03B 32/00
[52] U.S. Cl. ................... 65/30.11; 65/32; 65/64; 106/DIG. 6; 501/13; 501/77; 501/56
[58] Field of Search .............. 65/32, 64, 102, 157, 65/DIG. 2, 183, 30.11; 106/DIG. 6; 264/2

[56] References Cited

U.S. PATENT DOCUMENTS

| | | | |
|---|---|---|---|
| 3,208,860 | 9/1965 | Armistead et al. | 106/DIG. 6 |
| 3,467,513 | 9/1969 | Dockerty | 65/183 |
| 3,548,060 | 12/1970 | Suzuki et al. | 106/DIG. 6 |
| 3,653,863 | 4/1972 | Araujo et al. | 65/DIG. 2 |
| 3,703,388 | 11/1972 | Araujo et al. | 106/DIG. 6 |
| 3,834,912 | 9/1974 | Gliemeroth | 106/DIG. 6 |
| 3,876,436 | 4/1975 | Lythgoe | 106/DIG. 6 |
| 3,892,582 | 7/1975 | Simms | 65/32 X |
| 3,957,498 | 5/1976 | Reade | 106/DIG. 6 |
| 4,118,214 | 10/1978 | Wedding | 65/32 X |
| 4,125,405 | 11/1978 | Araujo et al. | 106/DIG. 6 |
| 4,190,451 | 2/1980 | Hares et al. | 106/DIG. 6 |
| 4,240,836 | 12/1980 | Borrelli et al. | 65/32 X |

FOREIGN PATENT DOCUMENTS

1411766  10/1975  United Kingdom ......... 106/DIG. 6

*Primary Examiner*—Richard V. Fisher
*Attorney, Agent, or Firm*—Clinton S. Janes, Jr.

[57] ABSTRACT

The instant invention is directed to the production of highly polarizing glasses, i.e., the glasses exhibit dichroic ratios up to 40 and higher, from silver-containing glasses that are characterized as being phase separable or, more preferably, as being photochromic because of the presence of silver halide particles therein, i.e., particles selected from the group of AgCl, AgBr, and AgI. The inventive method contemplates two general steps:

(a) the glasses are elongated under stress such that the glass phases and/or silver halide particles are elongated and aligned in the direction of the stress; and (b) the elongated glasses are heat treated in a reducing environment at temperatures below the annealing point of the glass but above about 300° C. to reduce a portion of the silver ions in the glass to metallic silver which is deposited in at least one of the glass phases and/or along the phase boundaries of the glass phases and/or deposited upon the silver halide particles.

8 Claims, No Drawings

METHOD FOR MAKING POLARIZING GLASSES BY EXTRUSION

BACKGROUND OF THE INVENTION

The manufacture of polarizing materials, especially in sheet form, is well known to the art. The process conventionally involves dispersing a mass of light-polarizing particles in a suspending medium and subsequently causing the medium to flow, as by extruding, rolling, or stretching, to elongate the particles, where necessary, and to orient the particles in the direction of medium flow. The great majority of the research effort and commercialization of polarizing materials has centered upon an organic plastic as the suspending medium with organic and/or inorganic molecules and/or crystals being dispersed and oriented therewithin. This circumstance is quite understandable when it is appreciated that many organic plastics possess relatively low softening temperatures, thereby permitting their flow without the need for substantially elevated temperatures. Nevertheless, organic plastics are subject to low hardness, poor scratch resistance, low temperature capabilities, moisture susceptibility, and, in many compositions, a low refractive index. Such characteristics have tended to limit the application for such products.

Glasses are known which answer the above limitations in properties exhibited by organic plastics. And means have been disclosed for manufacturing polarizing glasses. An early discussion of such products is provided in U.S. Pat. No. 2,123,901. Very fine metallic particles and inorganic crystals have been utilized as the polarizing materials. A special type of polarizing glass is found in U.S. Pat. No. 3,653,863. That patent teaches the preparation of photochromic polarizing glasses having base compositions in the inorganic silicate field and containing submicroscopic particles of a silver halide selected from the group of silver chloride, silver bromide, and silver iodide. The method comprises stretching the photochromic glass, while being heated at temperatures between the annealing point and the softening point of the glass, to concurrently elongate the silver halide particles to an ellipsoidal configuration (commonly exhibiting a length-to-width ratio [aspect ratio] varying between about 2:1-5:1) and to orient the elongated particles in the direction in which the glass is being stretched. The stretched glass was quickly cooled to inhibit the particles from resuming their original shapes. Hence, the quick cooling froze the particles in an elongated configuration. The glasses demonstrate polarizing behavior when in the darkened state. Stated conversely, the glasses are not polarizing when in the clear or undarkened state.

More recently, photochromic and non-photochromic polarizing glasses have been prepared by elongating particles suspended therein via a hot extrusion technique. That procedure is described in detail in U.S. application Ser. No. 144,537, filed concurrently herewith in the names of Kuang-hsin K. Lo and Daniel A. Nolan under the title *Method for Making Polarizing Glasses Through Extrusion*, and that disclosure is incorporated herein by reference. Again, the photochromic glasses are polarizing when in the darkened state.

In summary, it is known that a polarizing glass can be produced by elongating in some fashion a glass containing small particles, the particles being oriented in the direction of glass flow and customarily being elongated also. The deformation of the glass and concurrent elongation of the particles can be achieved via extruding, rolling, or stretching, each of those methods providing anisotropic particles which impart the polarizing property to the glass.

In the case of polarizing photochromic glasses containing silver halide particles, the polarizing property has been hypothesized to be due to the anisotropy afforded by the elongated silver halide particles and the adsorption of silver metal particles produced on the surface of the silver halide by the impingement of actinic radiation, commonly ultraviolet radiation. The magnitude of the dichroic ratio, defined as the ratio of the absorption parallel to the direction of elongated divided by the absorption perpendicular to the direction of elongation in the ultraviolet darkened state, has commonly been measured to be on the order of 2-3. A mathematical analysis of the dichroic behavior of elongated silver halide particles, wherein it was assumed that the particles are uniformly absorbing by virtue of the silver formation, indicated that a dichroic ratio in the vicinity of two is about the limiting value where the ratio of length-to-width of the elongated particles is on the order of five or greater. Hence, the values determined empirically are in good agreement with those predicted in the above analysis.

U.S. Pat. No. 4,125,405 describes the production of glasses exhibiting polarizing effects resulting from the photolytic reduction of silver. The dichroic ratios that can be derived through that process are limited because of the relatively low production of silver which, in turn, limits the amount of absorption occasioned by the silver. Thus, if the area of the entire particle or a significant portion thereof is reduced to metallic silver, then the dichronic ratio can be significantly greater. To summarize, where silver and silver halide particles are present which have like aspect ratios, the silver particles will demonstrate much higher dichroic ratios. Accordingly, the nature of the silver formation may be of equal significance to the degree of elongation of the particle itself.

U.S. application Ser. No. 95,435, filed Nov. 19, 1979 in the names of N. F. Borrelli and B. M. Wedding, now U.S. Pat. No. 4,240,836, discloses subjecting photochromic glasses, wherein silver halide crystals impart photochromic behavior to the glass, to a heat treatment at elevated temperatures, but below about 450° C., in a reducing environment, preferably an atmosphere of hydrogen. That treatment induces color in a thin layer on the surface of the glass, the hue and intensity of which depend not only upon the time and temperature of the reducing heat treatment but also upon the previous heat treatment applied to the glass to develop photochromic behavior therein. This latter circumstance would seem to indicate that the silver metal formed during the reducing treatment is in some way related to the presence of the silver halide crystals.

An interpretation proposed to explain this phenomenon suggests that silver ions in the glass and/or in the silver halide microcrystals are reduced to metallic silver on the silver halide particles during the reducing treatment and variations in the photochromic heat treatment alter the size and/or number of silver halide particles developed, this latter factor influencing the nature of the metallic silver formation on the silver halide particles.

SUMMARY OF THE INVENTION

This invention is founded in the discovery that silver-containing glasses which are characterized as being phase separable or, more desirably, as being photochromic through the presence of silver halide particles therein, viz., particles of AgCl, AgBr, and/or AgI, can be made to exhibit excellent polarizing behavior, i.e., the glasses demonstrate very high dichroic ratios. The inventive method comprehends two fundamental steps: first, the glasses are elongated under stress such that said glass phases and/or silver halide particles are elongated and aligned in the direction of the stress; and, second, the elongated glasses are heat treated in a reducing environment at temperatures below the annealing point of the glass, preferably not in excess of 500° C. but above about 300° C. Elongation of the glass can be accomplished via extruding, rolling, or stretching with the preferred mode being extrusion. The most efficient heat treatment in a reducing environment comprises temperatures between about 375°–450° C. and an atmosphere of hydrogen.

Mathematical calculations have indicated that an elliptical shell of metal such as silver is more anisotropic than a solid ellipsoid of the same aspect ratio. It is conjectured that the reduction of the extruded glass reduces a portion of the silver ions therein to metallic silver which is deposited in at least one of the elongated glass phases and/or along the elongated phase boundaries or deposited onto the silver halide particles to form an elliptical shell of metallic silver on the elongated silver halide particle. Dichroic ratios up to 20 and higher can be achieved. A dichroic ratio of 40 has been observed in one sample in the near infrared portion of the spectrum.

The inventive method appears to be operable essentially irrespective of the base composition of the photochromic glass so long as AgCl, AgBr, and/or AgI crystals constitute the photochromic agents, although it is highly desirable that large amounts ($>10\%$ by weight total) of PbO and other readily-reducible metal oxides are not included.

For example, U.S. Pat. No. 3,208,860, the basic patent in the field of photochromic glass manufacture, discloses the production of such from silicate-based glasses containing crystals of AgCl, AgBr, and/or AgI. Whereas other photochromic agents are known, all the commercially-marketed glasses have utilized silver halide crystals, especially AgCl and AgBr, as the photochromic materials. Moreover, the commercial glasses have customarily had base compositions within the alkali metal aluminoborosilicate system. Such glasses are designated in U.S. Pat. No. 3,208,860 as comprising the preferred embodiment with compositions consisting essentially, by weight, of 4–26% $Al_2O_3$, 4–26% $B_2O_3$, 40–76% $SiO_2$, and at least one alkali metal oxide selected from the group of 2–8% $Li_2O$, 4–15% $Na_2O$, 6–20% $K_2O$, 8–25% $Rb_2O$, and 10–30% $Cs_2O$. As photochromic elements, the glasses contain, by weight as chemically analyzed, at least one halogen in the minimum effective proportion of 0.2% chlorine, 0.1% bromine, and 0.08% iodine, and a minimum of silver in the indicated proportion of 0.2% where the effective halogen consists of chlorine, 0.05% where the effective halogen is bromine, but the glass contains less than 0.08% iodine, and 0.03% where the glass contains at least 0.08% iodine. The sum of the base glass components, silver, and halogens will constitute at least 85% by weight of the composition. Where a transparent article is desired, the total silver will not exceed 0.7% and the total of the three halogens will not exceed 0.6%.

Other examples of disclosures describing photochromic glasses of varying base compositions, but employing silver halide crystals as the photochromic agents, are recited below. U.S. Pat. No. 3,548,060 reports glasses having base compositions within the $Al_2O_3$-$B_2O_3$-RO field, i.e., the glasses consist essentially, by weight, of 2–35% $Al_2O_3$, 30–86% $B_2O_3$, and 12–45% of an alkaline earth metal oxide. U.S. Pat. No. 3,703,388 discusses glasses having base compositions within the $La_2O_3$-$B_2O_3$ system, viz., the glasses consist essentially, by weight, of 15–75% $La_2O_3$ and 13–65% $B_2O_3$. U.S. Pat. No. 3,834,912 records glasses with base compositions within the PbO-$B_2O_3$ system, i.e., the glasses consist essentially, by weight, of 14.2–48% $B_2O_3$, 29–73% PbO, 0–15% alkaline earth metal oxides, and 0–23% $ZrO_2$, $Al_2O_3$, and/or ZnO. U.S. Pat. No. 3,876,436 is directed to glasses having base compositions within the $R_2O$-$Al_2O_3$-$P_2O_5$ field, viz., the glasses consist essentially, by weight, of at least 17% $P_2O_5$, 9–34% $Al_2O_3$, not more than 40% $SiO_2$, not more than 19% $B_2O_3$, and at least 10% alkali metal oxides. U.S. Pat. No. 3,957,498 discloses glasses having base compositions within the $R_2O$-$Al_2O_3$$SiO_2$ system, i.e., the glasses consist essentially, by weight, of 13–21% alkali metal oxides, 17–25% $Al_2O_3$, and 45–56% $SiO_2$. Finally, U.S. Pat. No. 4,190,451 is drawn to glass compositions exhibiting exceptionally rapid darkening and fading rates coupled with relative temperature independence of the darkening and fading phenomena. Those glasses have compositions consisting essentially, in weight percent on the oxide basis, of 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, the molar ratio of alkali metal oxide:$B_2O_3$ ranging between about 0.55–0.85, where the composition is essentially free from divalent metal oxides other than CuO, and the weight ratio Ag:(Cl+Br) ranges about 0.65–0.95.

The preferred compositions for use in this embodiment of the inventive method have base compositions within the alkali metal aluminoborosilicate system described in U.S. Pat. No. 3,208,860, supra, with the most preferred compositions (excellent polarization+good photochromic behavior) being encompassed within the disclosure of U.S. Pat. No. 4,190,451, supra Whereas deformation of the glass and the elongation of the silver halide crystals therein can be accomplished by means of rolling, stretching, and extrusion, the latter two practices are preferred. Hence, in accordance with U.S. Pat. No. 3,653,863, supra, the glass is stretched, conveniently in a redraw apparatus, at temperatures between the annealing and softening points of the glass. In accordance with Ser. No. 144,537, supra, the glass is extruded at temperatures such that the viscosity thereof ranges between about $10^8$–$10^{13}$ poises, i.e., at temperatures between the annealing point and the softening point of the glass. This process has yielded silver halide particles having aspect ratios up to 30:1 and greater. Consequently, because of the inherent efficiencies of extrusion, when compared with stretching, coupled with the capability of securing higher aspect ratios in the elongated particles, extrusion as disclosed in Ser. No. 144,537, supra, is the most preferred mode for carrying out the elongation of the glass.

In a modification of the preferred inventive method, a composite body can be formed via concurrent extrusion of different glass compositions. It has been observed in the art that exposures of potentially photochromic glasses to high temperatures results in the growth of relatively large silver halide particles, the dimensions thereof becoming so great as to cause light scattering with consequent haze being seen in the glass. Furthermore, the fading rate of the glass becomes slower. We have found, however, that such particles require less mechanical stress to deform and resist the tendency to respheroidize to a much greater extent. Therefore, it is advantageous to produce a laminated body consisting of a thin skin glass which has been subjected to a high heat treatment to develop large silver halide crystals therein and an interior portion which has been exposed to the proper heat treatment to yield a transparent photochromic glass. Subsequent exposure of the composite body to the reducing environment provides a skin glass exhibiting high polarization and a transparent bulk portion manifesting good photochromic properties. Because the skin glass is very thin in cross section, any haze developed therein does not destroy the optical transmission of the composite.

In the other embodiment of the inventive method, utilizing a similar mechanism to achieve very high dichroic ratios but not relying totally or at all upon photochromic silver halide particles, phase-separable, alkali metal aluminoborosilicate glass compositions containing silver ions are employed. One or both phases of the glass will be elongated through extruding, rolling, or stretching and thereafter the glass is exposed to a reducing atmosphere at temperatures below the annealing point of the glass, preferably not in excess of 450° C. The silver ions are thereby reduced to metallic silver particles which are deposited in the elongated phase and/or along the elongated phase boundaries to form anisotropic metallic silver aggregates which give rise to the desired polarizing behavior. In general, base glasses operable in this embodiment of the invention will contain, in weight percent, about 5–12% alkali metal oxide, 20–35% $B_2O_3$, 1–15% $Al_2O_3$, and the remainder $SiO_2$, with the proviso that where $Al_2O_3$ is present in amounts greater than about 5%, a specific phase separating agent such as CdO and/or F must be included in an amount of at least 1%. The silver content will normally not exceed about 2%.

The advantage of utilizing these base glasses lies in the fact that the phase-separable compositions are much easier to elongate because of their low interfacial energy. This circumstance opens the possibility for making polarizing glasses through conventional forming techniques or, alternatively, utilizing any mechanical deformation technique which involves only a low stress level. However, the photochromic properties of the final products are not as good or may be entirely absent, if no silver halide particles are present.

The advantages of preparing polarizing glasses via the inventive heat treatment in a reducing atmosphere vis-a-vis the simple mechanical elongation of silver-containing glasses are several.

First, the method provides greater flexibility. Inasmuch as the polarization resulting from the heat treatment under reducing conditions is customarily confined to a thin surface layer, typically 10–100 microns in thickness, the process enjoys great versatility. For example, if only one surface of a glass article is subjected to the reducing environment (or a surface layer is mechanically or chemically removed from an article having several sides treated), the bulk glass can be photochromic and those photochromic properties not affected by the reduction treatment. Such articles can be useful in such applications as photochromic polarizing sun glasses. In another embodiment, intricate polarizing patterns can be produced in glass by applying impervious masking material thereto before the reduction-firing treatment such that only the exposed areas will be polarizing. An obvious means for providing designs in the glass contemplates mechanically or chemically removing designated patterned surface areas after the entire area has been subjected to the reduction heat treatment. And it is also apparent that a gradient polarization tint can be impressed in the glass surface by firing in a temperature gradient furnace or by selectively removing the fired surface via mechanical or chemical means.

Second, the glass need be elongated uniformly only in the surface layer where the reduction-firing reaction occurs. Hence, the size, shape, and alignment of the particles in the bulk glass have little effect upon the polarization character of the final product. This feature eliminates the need for critical control during the elongation process. Moreover, because the polarization character is developed only in a thin surface layer, the optical properties of the glass, e.g., transmittance, polarization efficiency, and absorption spectrum, can be independently controlled through careful adjustments of firing time and temperature. This circumstance obviously affords additional process latitude.

Third, the inventive method permits the use of glasses having silver halide or other ionic silver-containing glasses which are easier to manufacture in high quality on a commercial scale. In contrast, the production of metallic silver-containing glasses is more difficult because the redox conditions of the molten glass must be rigorously controlled. Moreover, metallic silver particles function as nuclei for phase separation and/or devitrification in a number of glass composition fields. Finally, metallic silver chemically attacks platinum, which metal is commonly utilized in melting units for optical and ophthalmic glasses.

Fourth, because the amount of an ionic silver-containing species such as silver halide which results in a certain transmittance in a glass is much greater than the amount of metallic silver which would yield an equivalent transmittance, the particle growth in the former system is much more easily controlled and faster. This circumstance not only serves to make the reduction treatment less painstaking, but also leads to particles of larger size, thereby rendering mechanical elongation of the particles easier than in the metallic silver-containing glasses.

DESCRIPTION OF THE PREFERRED EMBODIMENTS

The following table reports several glass compositions, expressed in parts by weight on the oxide basis, which are being supplied to illustrate the inventive method. Inasmuch as the sum of the individual components closely approximates 100, for all practical purposes the recorded values can be deemed to reflect weight percent. Because it is not known with which cation(s) the halogens are combined, they are merely tabulated as halides, in accordance with conventional glass analysis practice. Also, because the amounts of silver are so small, they are simply listed as Ag.

The actual batch ingredients may comprise any materials, either oxides or other compounds, which, when melted in combination with the other components, will be converted to the desired oxide in the proper proportions. The batch ingredients were compounded, ball-milled together to aid in achieving a homogeneous melt, and charged into platinum crucibles. After covering with a lid, the crucibles were introduced into a furnace operating at about 1300°–1450° C., the batches melted for about four hours, the melts then poured into steel molds to form slabs about 6"×6"×½", and the slabs were immediately transferred to an annealer operating at about 450° C.

TABLE I

| | 1 | 2 | 3 | 4 | 5 | 6 | 7 |
|---|---|---|---|---|---|---|---|
| $SiO_2$ | 51.8 | 51.8 | 51.8 | 51.8 | 51.8 | 55.3 | 51.8 |
| $Al_2O_3$ | 7.8 | 7.8 | 7.8 | 7.8 | 7.8 | 8.41 | 7.8 |
| $Na_2O$ | 9.2 | 9.2 | 9.2 | 9.2 | 9.2 | 8.8 | 9.2 |
| $B_2O_3$ | 31.0 | 31.0 | 31.0 | 31.0 | 31.0 | 27.1 | 31.0 |
| F | 1.17 | 1.755 | 2.34 | 2.34 | 1.17 | 2.1 | 1.17 |
| Cl | 0.26 | 0.39 | 0.52 | 0.52 | 1.04 | 0.48 | 1.04 |
| Br | 0.60 | 0.9 | 1.2 | 1.2 | 0.6 | 1.07 | 2.4 |
| Ag | 0.09 | 0.135 | 0.18 | 0.27 | 0.18 | 0.18 | 0.18 |
| CdO | 0.09 | 0.135 | 0.18 | 0.18 | 0.09 | 0.15 | 0.09 |

| | 8 | 9 | 10 | 11 | 12 | 13 |
|---|---|---|---|---|---|---|
| $SiO_2$ | 56.46 | 56.64 | 58.6 | 56.61 | 61.2 | 58.6 |
| $B_2O_3$ | 18.15 | 17.64 | 18.3 | 18.0 | 15.3 | 18.3 |
| $Al_2O_3$ | 6.19 | 6.2 | 9.51 | 6.2 | 10.4 | 9.53 |
| $Li_2O$ | 1.81 | 1.82 | 1.86 | 1.82 | 3.6 | 1.86 |
| $Na_2O$ | 4.08 | 6.15 | 2.95 | 5.83 | 7.4 | 2.7 |
| $K_2O$ | 5.72 | 5.73 | 9.77 | 5.73 | 0.4 | 9.76 |
| $ZrO_2$ | 4.99 | 5.0 | — | 5.0 | — | — |
| Ag | 0.207 | 0.29 | 0.32 | 0.29 | 0.5 | 0.36 |
| CuO | 0.006 | 0.02 | 0.016 | 0.01 | 0.06 | 0.012 |
| Cl | 0.166 | 0.2 | 0.30 | 0.2 | 0.6 | 0.299 |
| Br | 0.137 | 0.14 | 0.15 | 0.14 | — | 0.146 |
| $TiO_2$ | 2.07 | 1.62 | — | 1.62 | — | — |
| MoO | — | — | — | — | — | — |
| F | — | — | — | — | 0.5 | — |

| | 14 | 15 | 16 | 17 | 18 | 19 | 20 |
|---|---|---|---|---|---|---|---|
| $SiO_2$ | 58.6 | 51.8 | 51.8 | 57.16 | 56.97 | 56.62 | 57.62 |
| $B_2O_3$ | 18.3 | 31.0 | 31.0 | 22.69 | 22.61 | 22.48 | 32.3 |
| $Al_2O_3$ | 9.53 | 7.8 | 7.8 | 9.56 | 9.53 | 9.47 | 2.11 |
| $Li_2O$ | 1.86 | — | — | — | — | — | — |
| $Na_2O$ | 2.7 | 9.2 | 9.2 | 7.78 | 7.73 | 8.29 | 6.02 |
| $K_2O$ | 9.76 | — | — | 0.01 | 0.92 | 0.91 | 0.02 |
| Ag | 0.32 | 0.18 | 0.18 | 0.11 | 0.11 | 0.21 | 1.85 |
| CuO | 0.012 | — | — | 0.42 | 0.42 | 0.307 | — |
| Cl | 0.299 | 0.52 | 0.52 | 2.542 | 2.51 | 3.2 | — |
| Br | 0.146 | 1.2 | 1.2 | — | — | — | — |
| $TiO_2$ | — | — | — | 0.01 | 0.01 | — | 0.01 |
| CdO | — | 0.09 | 0.05 | 2.23 | 1.67 | 1.66 | — |
| F | — | 2.34 | 2.34 | 1.413 | 1.41 | 1.4 | — |

The following table records the time and temperature to which Examples 1–19 were exposed to develop photochromic behavior therein. Examples 17–20 represent phase-separable compositions with Example 20 being a non-photochromic glass since no silver halide particles are present therein. A 2" diameter disc was cut from such slab of the above exemplary compositions and extruded into ¼" rods in accordance with the technique disclosed in Ser. No. 144,537, supra, utilizing a temperature of 600° C. and a pressure of 25,000 psi to produce a reduction ratio of 16. (Examples 1–19 were subjected to the photochromism heat treatment prior to extrusion.) The average aspect ratio exhibited by the elongated silver and silver halide particles, as determined via electron microscopy, ranged from about 4:1 to greater than 20:1, with the preferred varying between about 6:1–9:1. Specimens were taken from those rods and each side thereof ground and polished. The reduction treatment was carried out in a laboratory furnace fitted with a stainless steel tube through which an appropriate gas could be passed. Because of the inherent efficiency of hydrogen as a reducing environment, that gas was employed in the described studies. Nevertheless, it will be recognized that other well-known reducing atmospheres such as cracked ammonia, combinations of $CO_2$ and CO, and mixtures of hydrogen with other gases, e.g., forming gas, will likewise be effective. The reduction reaction is dependent upon temperature, i.e., the higher the temperature the more rapid the reduction, and the depth within the glass to which the reaction proceeds follows the law of diffusion, viz., at a constant temperature the depth to which the reaction penetrates varies with the square route of time. In general, the reduction procedure here will be conducted for a sufficient length of time to develop a reduced surface layer having a thickness of at least 10 microns and, preferably, 50 microns. As noted above, the elongated silver halide particles demonstrate a tendency to respheroidize at elevated temperatures. Consequently, the reducing heat treatment will be undertaken at temperatures below the strain point of the glass and, preferably, below 450° C. Table II also records the time and temperature of the reduction treatment applied to each exemplary composition of Table I.

The polarization character of the specimens was examined before and after the hydrogen-firing process utilizing a spectrophotometer adapted with a polarizer and a rotatable sample holder. The dichroic ratio exhibited by each sample, where measured, and the wavelength at which this measurement was made are recited in Table II. The dichroism demonstrated after extrusion has been termed photolytic dichroism. The polarization efficiency and average transmission of the samples at specific wavelengths after hydrogen reduction are also reported. Those optical data refer to two surfaces having reduced layers of about 50 microns' thickness.

TABLE II

| Example | Photochromism Temp. | Photochromism Time | Photolytic Dichroic Ratio 0.55 μm | Reduction Temp. | Reduction Time | Dichroic Ratio 0.6 μm | Dichroic Ratio 0.55 μm | Polar. Eff. 0.55 μm | Average Trans. 0.55 μm |
|---|---|---|---|---|---|---|---|---|---|
| 1 | 650° C. | 0.5 hr | 2.1 | | | | | | |
| 2 | " | " | 2.6 | 410° C. | 1 hr. | 6.0 | 4.3 | 62 | 40 |
| 2 | " | " | 2.6 | " | 2.5 hr | 5.3 | 4.4 | 71 | 35 |
| 2 | " | " | 2.42 | 360° C. | 0.5 hr | 14 | 7.3 | 90 | 32 |
| 3 | " | " | 2.42 | 370° C. | 3 hrs | 24 | 9.1 | 97 | 30 |
| 3 | " | " | 2.42 | 400° C. | 3 hrs | 16 | 8 | 96 | 29 |
| 3 | " | " | 2.42 | 430° C. | 0.5 hr | 19 | 7.9 | 88 | 34 |
| 3 | " | " | 2.42 | 430° C. | 1.5 hr | 25 | 11.2 | 98 | 30 |
| 3 | " | " | 2.42 | 440° C. | 1 hr | 20 | 9.0 | 97 | 30 |
| 3 | 720° C. | " | — | 430° C. | 1 hr | 12.5 | 8.0 | 98 | 26 |
| 4 | 650° C. | " | 2.28 | 430° C. | 2 hrs | 12 | 7.1 | 98 | 22 |
| 4 | " | " | 2.28 | 377° C. | 4 hrs | 13 | 8.0 | 98 | 25 |

TABLE II-continued

| Example | Photochromism Temp. | Photochromism Time | Photolytic Dichroic Ratio 0.55 μm | Reduction Temp. | Reduction Time | Dichroic Ratio 0.6 μm | Dichroic Ratio 0.55 μm | Polar. Eff. 0.55 μm | Average Trans. 0.55 μm |
|---|---|---|---|---|---|---|---|---|---|
| 5 | | | 2.06 | | | | | | |
| 6 | 700° C. | 10 min. | 1.58 | 400° C. | 21 hrs | — | 1.3 | — | — |
| 7 | " | " | 1.58 | " | " | — | 1.3 | — | — |
| 8 | 660° C. | 1 hr | 1.86 | 390° C. | 1 hr | 7.3 | 3.2 | 66 | 47 |
| 9 | 660° C. | 1 hr | 2.08 | 430° C. | 1 hr | 3.33 | 1.7 | 47 | 38 |
| 9 | " | " | 2.08 | 377° C. | 3 hrs. | 6.5 | 3.1 | 87 | 15 |
| 10 | 720° C. | 20 min. | 1.97 | 377° C. | 4 hrs | 7.6 | 5.7 | 92 | 26 |
| 10 | " | " | 1.97 | 377° C. | 24 hrs | 7.7 | 5.2 | 98 | 15 |
| 10 | " | " | 1.97 | 370° C. | 72 hrs | 16 | 9.3 | 99 | 19 |
| 10 | " | " | 1.97 | 400° C. | 1 hr | 7 | 5.5 | 89 | 27 |
| 11 | 660° C. | 1 hr | 1.5 | 400° C. | 3 hrs | 3 | 3 | — | — |
| 12 | 700° C. | 0.5 hr | — | 400° C. | 3 hrs | 3 | 3 | — | — |
| 13 | 650° C. | 1 hr | — | 400° C. | 3 hrs | 3 | 3 | — | — |
| 13 | 720° C. | 2 hrs | 2.0 | 495° C. | 3 hrs | 13 | 10 | 97 | 33 |
| 13 | 720° C. | 2 hrs | 2.0 | 495° C. | 1 hr | 6 | 5.7 | 66 | 43 |
| 14 | 720° C. | 20 min | 2.0 | 435° C. | 16 hr | 14 | 8.9 | 99 | 27 |
| 14 | 720° C. | 20 min | 2.0 | 435° C. | 3 hrs | 21 | 11 | 97 | 33 |
| 14 | 720° C. | 20 min | 2.0 | 365° C. | 16 hrs | 11.5 | 5.6 | 98 | 17.7 |
| 15 | 650° C. | 0.5 hr | 2.4 | 430° C. | 1 hr | 20 | 10 | 97 | 30 |
| 16 | 650° C. | 0.5 hr | 2.5 | 430° C. | 1 hr | 21 | 11 | 99 | 30 |
| 17 | 650° C. | 1 hr | 1.3 | 400° C. | 2 hrs | 18 | 8 | 90 | 30 |
| 18 | 650° C. | 1 hr | 1.3 | 400° C. | 3 hrs | 8.7 | 3.8 | 89 | 18 |
| 19 | 650° C. | 1 hr | 1.3 | 370° C. | 5 hrs | 5.5 | 3.3 | — | — |
| 19 | 650° C. | 1 hr | 1.3 | 400° C. | 2 hrs | 18 | 7.9 | 91 | 29 |
| 20 | — | — | — | 400° C. | 2 hrs | 4 | 3 | 78 | 20 |

As can be observed from a study of Table II, the polarization character demonstrated by the elongated photochromic glasses is a function of the hydrogen reduction treatment. This circumstance is clearly apparent from a review of the several reduction treatments applied to Example 3 where the photochromic heat treatment was held constant, viz., 650° C. for 30 minutes. It can be seen that the maximum dichroic effect occurs at reduction temperatures on the order of 430° C. Of course, because the reduction treatment is time-temperature dependent, treatments at somewhat lower temperatures, but for correspondingly longer times, can yield approximately equivalent results.

Another observation that can be drawn from the values reported for Example 3 in Table II is the fact that higher temperature photochromic heat treatments before extrusion lead to poorer dichroic states after the reduction reaction. This situation exists in spite of the hazier appearance of the glass which is indicative of larger silver halide particle size.

Example 3 has the same base composition as Example 1 but with increased amounts of the photochromic elements. Table II illustrates that there is very little difference in the photolytic dichroism exhibited by the two glasses but, after hydrogen reduction, there is a wide variation therebetween with a marked increase in the dichroic ratio with excess photochromic elements. The composition of Example 2 is intermediate that of Examples 1 and 3 and Example 4 has the highest excess silver of those four compositions. These data make plain that excess amounts of silver and halogen play a significant role in determining the degree of dichroism attainable after hydrogen reduction, thereby indicating three important factors which must be taken into account when studying polarization effects achieved by the inventive method, viz., glass composition, the photochromic heat treatment, and the reduction heat treatment. That this interplay of those three factors is a complicated relationship can be seen from a comparison of the values recorded in Table II for Examples 3 and 4. It is demonstrated there that the increased dichroic effect resulting from the presence of excess photochromic elements can be offset by the use of a higher temperature photochromic heat treatment.

The temperature stability of the photolytic dichroism and the reduction treatment dichroism was examined by reheating samples of Examples 2 and 3 after extrusion and after hydrogen reduction, respectively. The results of those reheat treatments indicated that the photolytic dichroic ratio dropped off more slowly with increasing temperature than did the reduction-fired dichroism. For example, respheroidization of the elongated silver halide crystals produced via extrusion did not occur until temperatures above 500° C. In contrast, the polarization developed through hydrogen firing deteriorated very rapidly at 450° C. Electron microscopic examination of the hydrogen-fired glass after heat treating does not evidence that the silver halide particles have undergone any appreciable respheroidization, but the amount of precipitated silver on the silver halide particles has definitely decreased substantially. In some way the silver deposit has diffused into the glass and/or the crystal phase. Whatever the means, it seems apparent that the photolytic dichroism deterioration mechanism is different from that underlying the reduction-fired dichroism.

As was observed above, the inventive reduction-firing treatment is also operable on glass specimens which have been elongated via simple redrawing (stretching). As illustrative of this, Table III recounts the parameters of photochromic heat treatment, the stresses utilized in the redrawing technique, and the time and temperature of reduction firing in hydrogen applied to several of the examples of Table I, as well as the polarization properties exhibited by them. The aspect ratio of the stretched particles ranged from about 2–5.

TABLE III

| Example | Photochromism Temp. | Time | Drawing Stress | Dichroic Ratio 0.55μm | Reduction Temp. | Time | Dichroic Ratio 0.55μm | Polar. Eff. 0.55μm | Average Trans. 0.55μm |
|---|---|---|---|---|---|---|---|---|---|
| 10 | 720° C. | 20 min. | 5400 psi | 1.74 | 435° C. | 3 hrs | 4.5 | 60% | 42% |
| 10 | 720° C. | 40 min. | 1900 psi | 1.50 | 435° C. | 4 hrs | 3.9 | 50% | 46% |
| 10 | 720° C. | 80 min. | 3300 psi | 1.89 | 435° C. | 4 hrs | 13.0 | 99% | 33% |
| 10 | 720° C. | 160 min. | 2300 psi | 2.0 | 435° C. | 3 hrs | 8.9 | 97% | 32% |
| 15 | 650° C. | 3 hrs | 1630 psi | 2.26 | 435° C. | 4 hrs | 10.0 | 98% | 30% |
| 16 | 650° C. | 3 hrs | 1940 psi | — | 435° C. | 3 hrs | 6.3 | 80% | 36% |

It is of interest to compare the polarizing properties displayed by the stetched samples of Examples 10, 15, and 16 with their respective extruded counterparts. Example 10 is quite comparable to extruded Example 10 whereas Examples 15 and 16 are considerably less dichroic than their extruded counterparts.

Example 8 demonstrates inherent very excellent photochromic properties. By reduction-firing only one side of a plate or sheet of Example 8 in the elongated state, it is possible to obtain a highly dichroic surface layer without seriously affecting the photochromic characteristics of the body portion.

The fabrication of laminated articles via hot extrusion is described in Ser. No. 144,537, supra. Such an article was prepared wherein Example 8 constituted the skin layer (~0.5 mm thickness) and Example 16 the interior portion (~2 mm thickness). The skin glass was subjected to a severe photochromic heat treatment of 775° C. for about 5 minutes and the interior glass was exposed at 650° C. for 0.5 hour. (Both of those photochromic heat treatments were applied, of course, prior to the extrusion step.) The laminated body was then fired in a hydrogen atmosphere for 16 hours at 430° C. The body exhibited an initial polarization efficiency of 70% at 550 μm and a polarization efficiency in the darkened state of 78%. The transmission of the glass varies from 42% to 18%. Such properties can obviously be modified by varying glass composition, photochromic treatment, and reduction firing treatment.

One advantage of this lamination technique is that advantage can be taken of the resistance of the hazy-skin glass to respheroidization in the reshaping of a glass body into a lens after extrusion. This feature can also be improved upon by employing a softer interior glass so that reshaping can be carried out at lower temperatures. Another advantage made possible by this technique resides in the use of laminae having different coefficients of thermal expansion and/or viscosities such that the laminate is self-strengthening.

We claim:

1. A method for making glasses exhibiting excellent polarizing properties, i.e., glasses demonstrating high dichroic ratios, from silver-containing glasses characterized as being phase separable or as being photochromic through the presence of silver halide particles therein selected from the group of AgCl, AgBr, and AgI, which comprises the steps of:
   (a) elongating said glasses under stress via extrusion conducted at temperatures between the annealing point and softening point of the glass such that said glass phases and/or silver halide particles are elongated and aligned in the direction of the stress; and
   (b) heat treating said elongated glasses in a reducing environment at temperatures below the annealing point of the glass but above about 300° C. for a time sufficient to reduce a portion of the silver ions in said glass to metallic silver which is deposited in at least one of said elongated glass phases and/or along the phase boundaries of said elongated glass phases and/or deposited upon said silver halide particles.

2. A method according to claim 1 wherein said glasses demonstrate dichroic ratios of up to 40.

3. A method according to claim 1 wherein said photochromic glass consists essentially, by weight, of 0-2.5% $Li_2O$, 0-9% $Na_2O$, 0-17% $K_2O$, 0-6% $Cs_2O$, 8-20% $Li_2O+Na_2O+K_2O+Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, the molar ratio of alkali metal oxide:$B_2O_3$ ranging between about 0.55-0.85, where the composition is essentially free from divalent metal oxides other than CuO, and the weight ratio Ag:(Cl+Br) ranges about 0.65-0.95.

4. A method according to claim 1 wherein said exposure to a reducing environment is carried out for a time sufficient to develop a surface layer of at least 10 microns thickness wherein said silver ions are reduced to metallic silver.

5. A method according to claim 1 wherein said exposure of said elongated glass to a reducing environment is carried out in a hydrogen atmosphere at a temperature between 375°-450° C.

6. A method according to claim 1 wherein said phase-separable glass containing silver has a base composition consisting essentially, in weight percent, of about 5-12% alkali metal oxide, 20-35% $B_2O_3$, 1-15% $Al_2O_3$, and the remainder $SiO_2$, with the proviso that where $Al_2O_3$ is present in amounts greater than about 5%, at least 1% of a phase separating agent will be included in the composition.

7. A method according to claim 6 wherein said phase separating agent is selected from the group of F and CdO.

8. A method according to claim 1 wherein said photochromic glass consists essentially, by weight, of 4-26% $Al_2O_3$, 4-26% $B_2O_3$, 40-76% $SiO_2$, and at least one alkali metal oxide selected from the group of 2-8% $Li_2O$, 4-15% $Na_2O$, 6-20% $K_2O$, 8-25% $Rb_2O$, and 10-30% $Cs_2O$, at least one halogen in the minimum effective proportion of 0.2% chlorine, 0.1% bromine, and 0.08%, iodine, and a minimum of silver in the indicated proportion of 0.2% where the effective halogen is chlorine, 0.05% where the effective halogen is bromine, but the glass contains less than 0.08% iodine, and 0.03% where the glass contains at least 0.08% iodine, the sum of the base glass components, halogens, and silver constituting at least 85% by weight of the composition.

* * * * *